June 21, 1932. W. S. BREMER 1,863,918
COOKING UTENSIL THERMOMETER
Filed Oct. 15, 1931
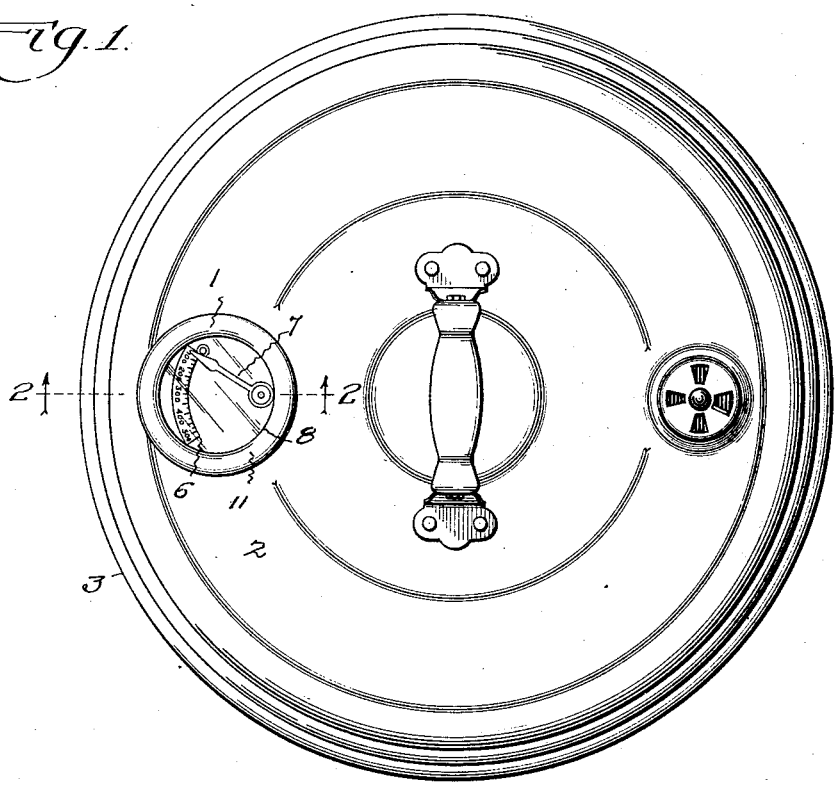
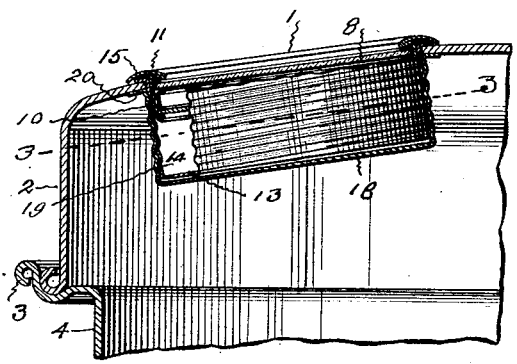
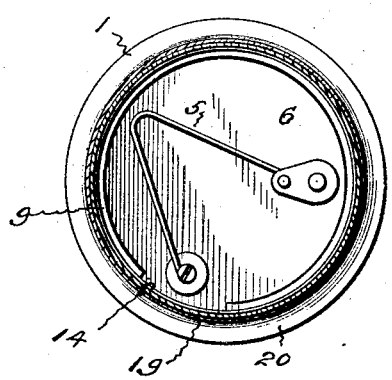
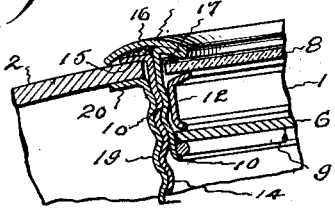
Inventor:
William S. Bremer
By Harry P. Williams
Atty Patented June 21, 1932

1,863,918

UNITED STATES PATENT OFFICE

WILLIAM S. BREMER, OF CHICAGO, ILLINOIS

COOKING UTENSIL THERMOMETER

Application filed October 15, 1931. Serial No. 568,895.

This invention relates to the attachment of thermostatic thermometers to the walls or covers of cooking utensils, such as pots, pans, kettles, skillets, Dutch ovens and the like, for indicating the temperature therein. When food is cooked in such utensils, whether they are heated by electricity, gas, oil or coal, more or less steam or vapor is generated. With utensils provided with thermostatic thermometers as previously constructed and applied, the steam or vapor sooner or later leaks into the thermometers and affects their action to a degree that destroys their efficiency, or at least causes an objectionable discoloration of the thermometer dial.

The object of the present invention is to so construct and apply a thermostatic thermometer to the wall or cover of a cooking utensil that steam or vapor generated in the utensil, even if considerable pressure should be developed, will not leak or penetrate into the thermometer.

This object is attained by enclosing the indicating and operating elements of the thermometer in a tight case which is shaped to fit in an opening in the utensil, the case having an annular exterior flange that rests on the outside of the wall or cover of the utensil about the opening, and then threading on the inner portion of this case a closed cap which has an annular exterior flange that is forced against the inside of the wall or cover around the opening in the utensil, suitable packings being placed on the outside between the flange of the case and a bezel that is threaded into the case and extends over the glass and case flange.

In the accompanying drawing, Fig. 1 shows the top of a cooking utensil with a thermostatic thermometer applied according to this invention. Fig. 2 shows on somewhat larger scale a section on the plane indicated by the dotted line, 2 . . . 2 on Fig. 1, of the thermometer in the cover of the utensil. Fig. 3 is a transverse section on the plane indicated by the dotted line, 3 . . . 3 on Fig. 2, of the thermometer, looking up toward the thermoresponsive element. Fig. 4 is a sectional view on larger scale showing the manner of engaging the parts in order to render the thermometer steam and vapor tight.

In the arrangement illustrated, the thermometer, 1, is fitted into an opening in the top of the cover, 2, that rests on the flange, 3, at the upper edge of the utensil wall, 4.

The thermometer of the type referred to, below the dial disk, 6, has a thermo-responsive arm, 5, that actuates the pointer, 7, which is above the dial disk and below the glass, 8. The dial disk is supported below by a spring ring, 9, that is snapped into the threaded sleeve, 10, of the bezel, 11, the outer edge of which is folded over against the top of a utensil cover and against the glass. A band, 12, is placed between the upper face of the dial disk and the under face of the glass for retaining these parts in proper relation.

The case which encloses the operating and indicating elements of the thermometer is cup-shaped and has a closed bottom wall, 13, threaded side wall, 14, and a flange, 15, extending outward around its open end. The bezel with the glass, separating band, dial disk and retaining ring are threaded into the upper end of the thermometer case, and the assembled elements placed in the opening in the utensil cover with the flange, 15, resting on the top of the cover around the opening. A packing ring, 16, is preferably placed between the inside of the bezel and the upper face of the flange, 15, and a packing ring, 17, is placed between the under side of the bezel and the top of the glass.

After this structure has been placed in the opening in the utensil cover, a cap with a closed bottom, 18, threaded side wall, 19, and exterior flange, 20, is threaded on the part of the thermometer case that is inside of the utensil cover, until the flange, 20, abuts tightly against the inside of the utensil cover around the opening.

With this arrangement, the thermometer actuating and indicating elements are in a tight case, the only joint between which and the cover is that on the outside of the cover around the opening, and this tight case is further enclosed by the cap. Any possible leakage of steam or vapor that might occur between the cap flange and the under side of the cover would have to escape between the case flange on the top of the cover, where it would be discharged into the atmosphere. The packings on the outside prevent the return of any steam or vapor from the atmosphere into the thermometer, there being no pressure on the outside. The packings on the outside are not subjected to such heat as they would be on the inside of the cover and so retain the outer joints tight. The cap performs two functions, that of enclosing the thermometer proper and retaining the thermometer steam tight, and also that of locking the thermometer in place, and when the parts are designed and assembled in the manner described, the operating elements of the thermometer do not become corroded or rusted, and the dial does not become discolored or soiled.

The invention claimed is:

1. The combination with the wall of a cooking utensil, of a thermometer case having a threaded closed inner portion fitted into an opening through the wall and having a flange that lies on the outer surface of the wall around the opening, and a closed cap threaded on the threaded inner portion of the case and having a flange in tight engagement with the inner surface around the opening through the wall.

2. The combination with the wall of a cooking utensil, of a thermometer case having a closed threaded inner portion, fitted in an opening through the wall and having a flange that lies on the outer surface of the wall around the opening, a closed cap threaded on the threaded inner portion of the case and having a flange in tight engagement with the inner surface around the opening through the wall, and a bezel threaded into the case and having its outer edge covering said case flange.

3. The combination with the wall of a cooking utensil, of a thermometer case having a threaded enclosed inner portion fitted in an opening through the wall and having a flange that lies on the outer surface of the wall around the opening, a closed cap threaded on the threaded inner portion of the case and having a flange in tight engagement with the inner surface around the opening in the wall, a bezel threaded into the case and having its outer edge covering said case flange, and packing located between said bezel and the case flange.

4. A thermometer for application to cooking utensils which thermometer comprises thermo-responsive and indicating elements enclosed in tight case, said case having a threaded side wall and an outwardly extending flange at its open end adapted to rest on the outer surface of the utensil to which the thermometer is to be applied, and a cap threaded on said case, said cap having an outwardly extending flange adapted to be forced against the inner surface of the utensil.

WILLIAM S. BREMER.